Sept. 3, 1957  K. S. FOREMAN  2,804,750
COMPOUND MASTER BRAKE CYLINDER
Filed Feb. 25, 1954

Kenneth S. Foreman
INVENTOR.

United States Patent Office 2,804,750
Patented Sept. 3, 1957

2,804,750

COMPOUND MASTER BRAKE CYLINDER

Kenneth S. Foreman, Bunker Hill, Ill.

Application February 25, 1954, Serial No. 412,601

5 Claims. (Cl. 60—54.6)

This invention relates in general to improvements in hydraulic brake systems and more specifically to an improved compound hydraulic brake master cylinder construction.

In the operation of a hydraulic brake system when the hydraulic brake master cylinder is actuated, a relatively large quantity of fluid is first pumped by the master brake cylinder. As the piston of the master cylinder reaches the end of its stroke, the fluid within the brake system is compressed to tightly wedge brake shoes against their corresponding drums. While a relatively large cross-sectional piston cylinder is required to pump the necessary fluid to the brake system, it is highly desirable that a relatively small cross-sectional piston be provided in order that a relatively large pressure may be obtained within the brake system with a minimum of pressure being applied to an actuating pedal for the master cylinder.

It is therefore the primary object of this invention to provide a compound master cylinder and hydraulic brake system which includes a pair of pistons, one of the pistons being relatively large for pumping an initial quantity of fluid to completely fill the fluid system and extend the pistons of the individual wheel cylinders, and a relatively small second piston which comes into operation after the first piston has pumped the initial quantity of brake fluid and which is utilized to exert a relatively great pressure on the hydraulic fluid of the brake system.

Another object of this invention is to provide an improved compound master cylinder for a hydraulic brake system, the compound master cylinder being of extremely simple construction requiring a minimum number of parts which may be easily assembled so as to be economically feasible.

A further object of this invention is to provide an improved valve system for a compound master cylinder of a hydraulic brake system, the valve system being of such a nature whereby flow through the master cylinder is relatively simple and yet controlled at all times.

Figure 1:
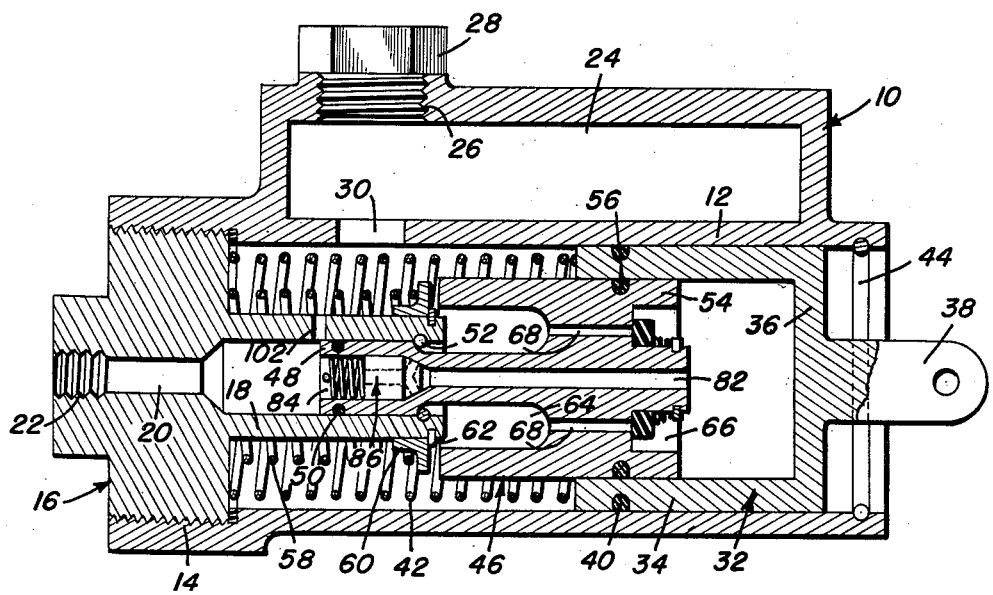
Figure 2:
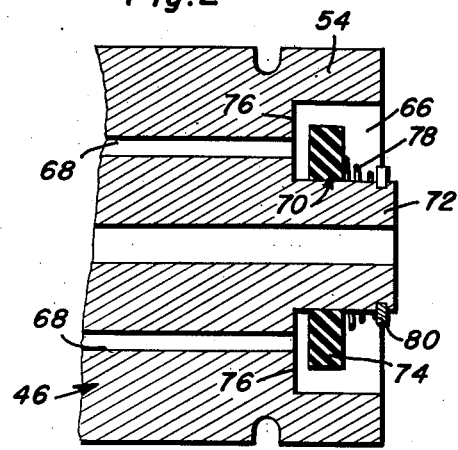
Figure 3:
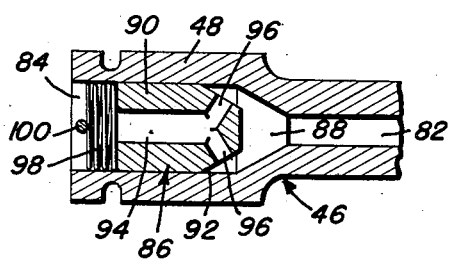

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal vertical sectional view taken through the compound master cylinder which is the subject of this invention and shows the relationship of the various portions thereof, the master cylinder being in an inoperative position;

Figure 2 is an enlarged fragmentary sectional view of a rear portion of the second piston and shows the check valve thereof in a position for admitting hydraulic fluid from a reservoir into the interior of the first piston; and Figure 3 is an enlarged fragmentary sectional view taken through the forward portion of the second piston and shows the channel construction of the check valve thereof, the check valve being in an open position permitting the pumping of hydraulic fluid through the second piston by the first piston.

Referring to the drawings now in detail, it will be seen that there is illustrated the master cylinder for a hydraulic brake system which is the subject of this invention. The master cylinder includes a housing which is referred to in general by the reference numeral 10. The housing 10 is preferably in the form of a casting and includes a relatively large diameter longitudinally extending first cylinder 12. The cylinder 12 has one end thereof internally threaded as at 14 and is closed by a removable plug which is referred to in general by the reference numeral 16. The rear portion of the plug 16 is of a reduced cross-section and is cylindrical, forming a second cylinder 18. Communicating with the interior of the second cylinder 18 passing through the forward end of the plug 16 is a bore 20. The bore 20 has the forward end thereof internally threaded as at 22 for receiving a brake line fitting.

The upper portion of the housing 10 is in the form of a relatively large fluid reservoir 24. The fluid reservoir 24 is provided with an internally threaded filler opening 26 which is normally closed by a removable filler cap 28. The bottom of the reservoir 24 is provided with an enlarged opening 30 which communicates the interior of the reservoir 24 with the first cylinder 12 and the second cylinder 18.

Slidably disposed within the first cylinder 12 for longitudinal movement therethrough is a first piston 32. The first piston 32 includes a cylindrical body portion and a transverse rear wall 36 so as to be hollow. Carried by the rear wall 36 and extending outwardly through the rear of the first cylinder 12 is a pin 38 which may be connected to a suitable linkage of a brake pedal assembly (not shown). The first piston 32 is sealed with respect to the inner surface of the first cylinder 12 by a circular cross-sectional sealing ring 40 carried by the outer forward porton of the first piston 32.

Disposed within the forward portion of the first cylinder 12 is an elongated coil spring 42 which has the forward end thereof bearing against the rear surface of the plug 16. The rear end of the coil spring 42 bears against the forward end of the first piston 32 and functions as a return spring for that piston. Rearward movement of the piston 32 within the first cylinder 12 is limited by a lock ring 44 carried by the rear portion of the cylinder 12 projecting into the interior thereof.

The master cylinder also includes a second piston which is referred to in general by the reference numeral 46. The second piston 46 includes a relatively small cross sectional forward portion 48 which is slidably disposed within the second cylinder 18 for longitudinal movement. The forward portion 48 is sealed with respect to the inner surface of the second cylinder 18 by a sealing ring 50 carried by the forward part of the forward portion 48 and wipingly engaging the inner surface of the second cylinder 18. Rearward movement of the second piston 46 within the second cylinder 18 is prevented by a locking ring 52 carried by the inner portion of the second cylinder 18 adjacent the rear end thereof engaging the rear part of the forward portion 48.

The second piston 46 also includes a relatively large circular cross sectional rear portion 54. The rear portion 54 has an external diameter substantially equal to the internal diameter of the cylindrical body portion 34 in the first piston 32 and is slidably guidingly disposed therein. The rear portion 54 of the second piston 46 is provided adjacent its rear end with a sealing ring 56 which wipes against the inner surface of the piston 32 to form a seal therewith.

Encircling the second cylinder 18 is a coil spring 58 which functions as a return spring for the second piston 46. The coil spring 58 has the forward end thereof in abutting relation with the rear surface of the plug 16. Seated in the rear portion of the coil spring 58 is an annular collar member 60 which is slidably disposed on the second cylinder 18. Rearward movement of the collar member 60 is limited by a locking ring 62 carried by the rear portion of the second cylinder 18.

The forward part of the rear portion 54 is provided with an annular recess 64 of a size to slide over both the second cylinder 18 and the locking ring 62 to permit the rear portion 54 to move into engagement with the collar member 60. While the rear portion 54 of the second piston 46 is normally spaced rearwardly of the collar member 60, after a slight initial forward movement of the second piston 46, the rear portion 54 thereof engages the collar member 60 to compress the return spring 58.

The rear part of the rear portion 54 is provided with an annular recess 66. Communicating the annular recess 66 with the annular recess 64 is a plurality of fluid passages 68. The fluid passages 68 communicate the interior of the first piston 32 with the reservoir 24. It is intended that fluid be supplied to the first piston 32 through the fluid passages 68.

As is best illustrated in Figure 2, a check valve assembly which is referred to in general by the reference numeral 70, is disposed within the annular recess 66. The check valve assembly 70 is carried by a central hub portion 72 which is formed in the form of the annular recess 66. The hub portion 72 has guidingly received thereon a resilient annular valve member 74 which is formed of a suitable material such as neoprene. The valve member 74 is urged towards and normally retained in seating relation with a forward boundary 76 of the annular recess 66 to close the rear ends of the fluid passages 68. The valve member 74 is urged forwardly by a coil spring 78 which engages the rear surface thereof. The coil spring 78 is prevented against rearward movement by a locking ring 80 carried by the rear part of the hub 72.

Communicating the interior of the first piston 32 with the interior of the second cylinder 18 is a longitudinal bore 82 through the center of the second piston 46. The bore 82 is provided at its forward end with an enlarged counter-bore 84 in which is seated a check valve assembly 86, as is best illustrated in Figure 3.

The intersection between the bore 82 and the counter-bore 84 is in the form of a tapered frusto-conical valve seat 88. The valve assembly 86 includes a valve member 90 slidably mounted within the counter-bore 84 and having a frusto-conical rear end 92 which is seatable on the valve seat 88. The valve member 90 has a fluid passage 94 therethrough which terminates at its rear end in diverging fluid passages 96 which pass through the frusto-conical rear portion 92.

Disposed in the forward portion of the counter-bore 84 is a spring 98. The spring 98 has the forward part thereof in engagement with a pin 100 which extends transversely of the counter-bore 84 and which is carried by the second piston 46. The rear end of the spring 98 engages the valve member 90 and urges it rearwardly in seating relation with the valve seat 88 to close the fluid passages 96.

In order that fluid may return from the brake system into the reservoir 24, the reservoir 24 is communicated with the interior of the second cylinder 18, by a fluid passage 102 which extends transversely of the second cylinder 18 intermediate its ends. The fluid passage 102 is so positioned whereby when the second piston 46 is in its rearmost position the forward part of the forward portion 48 is disposed rearwardly of the fluid passage 102 so as not to close it. However, when the second piston 46 moves forwardly into engagement with the collar member 60, the forward portion 48 thereof moves forwardly and closes the fluid passage 102.

In the operation of the master cylinder which is the subject of this invention, forward force is applied to the pin 38 which causes forward movement, or movement to the left, as viewed in Figure 1, of the first piston 32. The initial forward movement of the first piston 32 results in the building up of pressure within the first piston 32 and the initial forward movement of the second piston 46 to a position closing the fluid passage 102. As the first piston 32 is moved further forwardly, fluid is pumped from the interior thereof through the fluid passage 82, into the second cylinder 18 and through the fluid passage 20.

When sufficient fluid has been pumped into the brake system of which the master cylinder is a part, further forward movement of the piston 32 will cause a build up of pressure within the brake system. Inasmuch as the second piston 46 has a larger rear area than its forward area, an increase of pressure within the first piston 32 will result in the movement of the second piston 46 with the first piston 32. Inasmuch as the cross-section of the forward portion 48 of the second piston 46 is relatively small as compared to the cross section of the piston 32, it will be seen that a relatively great pressure will be applied to the fluid disposed in the brake system.

When the pressure applied upon the pin 38 is reduced and the return springs 42 and 58 force the pistons 32 and 46, respectively, rearwardly, a vacuum is created within the piston 32 and fluid from within the first cylinder 12 and the reservoir 24 flows through the fluid passages 68 into the interior of the first piston 32. Further, as the second piston 46 moves rearwardly of the fluid passage 102, the fluid within the brake system will then return to the reservoir 24.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A compound hydraulic brake master cylinder comprising a housing, said housing including a first cylinder, a second cylinder projecting into said first cylinder and being of a lesser diameter than said first cylinder, a fluid reservoir overlying said first and second cylinders and communicating therewith, a first piston slidably disposed in said first cylinder, said first piston being hollow, a second piston slidably disposed in said second cylinder in telescoping relation, said second piston being provided with an enlarged portion disposed within said first piston and sealed relative thereto, a fluid passage through said second piston communicating the interior of said first piston with said second cylinder, a discharge port communicated with said second cylinder, said first piston being adapted to make an initial pumping stroke to force a large volume of fluid at a low pressure through said second cylinder and being fully telescoped over and engaged with said enlarged portion of said second piston at the termination of said initial pumping stroke to force said second piston through said second cylinder to force said fluid through said discharge port at a high pressure.

2. A compound hydraulic brake master cylinder comprising a housing, said housing including a first cylinder, a second cylinder projecting into said first cylinder and being of a lesser diameter than said first cylinder, a fluid reservoir overlying said first and second cylinders and communicating therewith, a first piston slidably disposed in said first cylinder, said first piston being hollow, a second piston slidably disposed in said second cylinder in telescoping relation, said second piston being provided with an enlarged portion disposed within said first piston and sealed relative thereto, a fluid passage through said second piston communicating the interior of said first piston with said second cylinder, a discharge port communicated with said second cylinder, said first piston being adapted to make an initial pumping stroke to force a large volume of fluid at a low pressure through said second cylinder and being fully telescoped over and engaged with said enlarged portion of said second piston at the termination of said initial pumping stroke to force said second piston through said second cylinder to force said fluid through said discharge port at a high pressure, said second cylinder having a transverse fluid passage facilitating the return flow of fluid into said reservoir through said first cylinder, said second piston being initially moved in response to initial movement of said first piston to close said transverse fluid passage.

3. A compound hydraulic brake master cylinder comprising a housing, said housing including a first cylinder, a second cylinder projecting into said first cylinder and being of a lesser diameter than said first cylinder, a fluid reservoir overlying said first and second cylinders and communicating therewith, a first piston slidably disposed in said first cylinder, said first piston being hollow, a second piston slidably disposed in said second cylinder in telescoping relation, said second piston being provided with an enlarged portion disposed within said first piston and sealed relative thereto, a fluid passage through said second piston communicating the interior of said first piston with said second cylinder, a discharge port communicated with said second cylinder, said first piston being adapted to make an initial pumping stroke to force a large volume of fluid at a low pressure through said second cylinder and being fully telescoped over and engaged with said enlarged portion of said second piston at the termination of said initial pumping stroke to force said second piston through said second cylinder to force said fluid through said discharge port at a high pressure, said second cylinder and said discharge port being part of a plug closing an end of said first cylinder.

4. A compound hydraulic brake master cylinder comprising a housing, said housing including a first cylinder, a second cylinder projecting into said first cylinder and being of a lesser diameter than said first cylinder, a fluid reservoir overlying said first and second cylinders and communicating therewith, a first piston slidably disposed in said first cylinder, said first piston being hollow, a second piston slidably disposed in said second cylinder in telescoping relation, said second piston being provided with an enlarged portion disposed within said first piston and sealed relative thereto, a fluid passage through said second piston communicating the interior of said first piston with said second cylinder, a discharge port communicated with said second cylinder, said first piston being adapted to make an initial pumping stroke to force a large volume of fluid at a low pressure through said second cylinder and being fully telescoped over and engaged with said enlarged portion of said second piston at the termination of said initial pumping stroke to force said second piston through said second cylinder to force said fluid through said discharge port at a high pressure, a return spring for said first piston surrounding said second piston and engaging said first piston, a return spring for said second piston surrounding said second cylinder and aligned with said second piston at one end thereof said enlarged portion of said second piston being provided with a recess receiving said second cylinder.

5. A compound hydraulic brake master cylinder comprising a housing, said housing including a first cylinder, a second cylinder projecting into said first cylinder and being of a lesser diameter than said first cylinder, a fluid reservoir overlying said first and second cylinders and communicating therewith, a first piston slidably disposed in said first cylinder, said first piston being hollow, a second piston slidably disposed in said second cylinder in telescoping relation, said second piston being provided with an enlarged portion disposed within said first piston and sealed relative thereto, a fluid passage through said second piston communicating the interior of said first piston with said second cylinder, a discharge port communicated with said second cylinder, said first piston being adapted to make an initial pumping stroke to force a large volume of fluid at a low pressure through said second cylinder and being fully telescoped over and engaged with said enlarged portion of said second piston at the termination of said initial pumping stroke to force said second piston through said second cylinder to force said fluid through said discharge port at a high pressure, a check valve in said second piston preventing the return flow of fluid through said fluid passage, a second fluid passage through said second piston communicating the interior of said first piston with said reservoir when said pistons are in retracted positions to supply fluid to said first piston, a check valve preventing reverse flow of fluid through said second fluid passage.

References Cited in the file of this patent
UNITED STATES PATENTS

| 1,958,722 | Sinclair et al. | May 15, 1934 |
| 2,272,360 | Swift | Feb. 10, 1942 |
| 2,674,097 | Kirk | Apr. 6, 1954 |